United States Patent
Soomro et al.

(10) Patent No.: US 7,903,570 B2
(45) Date of Patent: Mar. 8, 2011

(54) SYSTEM AND METHOD FOR SPECIFYING MEASUREMENT REQUEST START TIME

(75) Inventors: Amjad Soomro, Hopewell Junction, NY (US); Zhun Zhong, Croton-On-Hudson, NY (US); Stefan Mangold, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 755 days.

(21) Appl. No.: 10/556,010

(22) PCT Filed: May 3, 2004

(86) PCT No.: PCT/IB2004/001509
§ 371 (c)(1),
(2), (4) Date: Nov. 8, 2005

(87) PCT Pub. No.: WO2004/100451
PCT Pub. Date: Nov. 18, 2004

(65) Prior Publication Data
US 2007/0002757 A1    Jan. 4, 2007

Related U.S. Application Data

(60) Provisional application No. 60/469,195, filed on May 9, 2003, provisional application No. 60/503,851, filed on Sep. 17, 2003.

(51) Int. Cl.
*G01R 31/08* (2006.01)
*H04W 4/00* (2009.01)
*H04J 3/06* (2006.01)

(52) U.S. Cl. .................. 370/252; 370/338; 370/503

(58) Field of Classification Search .................. None
See application file for complete search history.

(56) References Cited

U.S. PATENT DOCUMENTS

| 5,563,607 A | 10/1996 | Loomis |
| 5,987,306 A | 11/1999 | Nilsen |
| 6,671,495 B1 * | 12/2003 | Lappetelainen et al. ... 455/67.11 |
| 6,732,142 B1 * | 5/2004 | Bates et al. ............... 709/203 |

(Continued)

FOREIGN PATENT DOCUMENTS

EP    1 298 848 A1    4/2003

(Continued)

OTHER PUBLICATIONS

IEEE Standard Part 11, Amendment 5: Spectrum and Transmit Power Management Extensions in the 5 GHz band in Europe. pp. 1-59, Oct. 14, 2003.

(Continued)

*Primary Examiner* — Kwang B Yao
*Assistant Examiner* — Jutai Kao
(74) *Attorney, Agent, or Firm* — Larry Liberchuk

(57) ABSTRACT

The present invention relates to specification of the start time for taking measurements in wireless local area networks (WLAN), in which the start time of measurements to be taken is included in a Measurement Start Time field of a Measurement Request Frame and the interpretation of the start time for a specific measured element is determined by a Mode field included in each Measurement Request Element field of the Measurement Request Frame. Optionally, the start time of a Measurement Request Frame is specified using a time synchronization function (TSF) timer value or part thereof in order to avoid ambiguities in interpretation of the start time reported.

8 Claims, 5 Drawing Sheets

U.S. PATENT DOCUMENTS

| | | | |
|---|---|---|---|
| 2002/0060995 A1 | 5/2002 | Cervello | |
| 2003/0103491 A1* | 6/2003 | Frederiksen et al. | 370/351 |
| 2006/0171362 A1* | 8/2006 | Garg et al. | 370/338 |
| 2008/0109513 A1* | 5/2008 | Fishhaut et al. | 709/203 |

FOREIGN PATENT DOCUMENTS

| | | |
|---|---|---|
| JP | 63104193 | 5/1988 |

OTHER PUBLICATIONS

"Proposed Text for Radio Measurement Requests and Reports", by Daryl Kaiser, Mar. 2003.

Transmitter Power Control (TPC) and Dynamic Frequency Selection (DFS) Joint Proposal for 802.11h WLAN, by S. Choi et al., May 16, 2001.

* cited by examiner

407

| x00 | THE MEASUREMENT IS REQUIRED TO START AT THE INDICATED START TIME. |
| --- | --- |
| x01 | THE MEASUREMENT IS REQUIRED TO COMMENCE AT SOME RANDOM INTERVAL AFTER THE INDICATED START TIME. |
| x10 | THE MEASUREMENT MAY START AT ANY TIME. |
| x11 | THE MEASUREMENT IS REQUIRED TO START IMMEDIATELY AFTER RECEIVING THE REQUEST. |
| 1xx | THE ACTUAL MEASUREMENT START TIME SHALL BE REPORTED BACK. |
| 0xx | THE ACTUAL MEASUREMENT START TIME MAY NOT BE REPORTED BACK. |

FIG. 4D

| NAME | MEASUREMENT TYPE |
| --- | --- |
| BASIC REQUEST | 0 |
| CCA REQUEST | 1 |
| RPI HISTOGRAM REQUEST | 2 |
| RESERVED | 3-255 |

420 brackets the first three data rows.

FIG. 4E

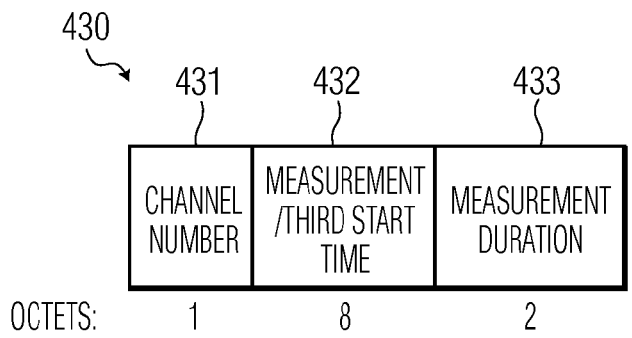

FIG. 4F

SYSTEM AND METHOD FOR SPECIFYING MEASUREMENT REQUEST START TIME

CROSS REFERENCE TO RELATED APPLICATION

This application claims the benefit of U.S. provisional application Ser. No. 60/469,195 filed May 9, 2003 and U.S. provisional application Ser. No. 60/503,851 filed Sep. 17, 2003, both of which are incorporated herein in whole by reference.

The present invention relates to specification of the interpretation of a start time for taking measurements in wireless local area networks (WLAN). The start time is specified by a time synchronization function (TSF) timer value or part thereof to eliminate the possibility of ambiguities.

In general, there are two types of wireless local area networks (WLAN) infrastructure-based and ad-hoc or independent. The former network is illustrated in FIG. 2A in which communication typically takes place only between the wireless nodes, termed stations ($STA_i$) 201, and an access point (AP) 200 whereas communication takes place between the wireless nodes $STA_i$ 201 in the latter network that is illustrated in FIG. 2B. $STA_i$ 201 and the AP 200 that are within the same radio coverage area are known as a basic service set (BSS). In the second type of WLAN, the $STA_i$ 201 that communicate directly with one another and where there is no AP, collectively are termed an independent basic service set or IBSS.

The IEEE 802.11 standard specifies the medium access control (MAC) and physical characteristics for a WLAN to support physical layer units. The IEEE 802.11 standard is defined in International Standard ISO/IEC 8802-11, "Information Technology—Telecommunications and Information Exchange Area Networks," 1999 Edition [1], which is hereby incorporated by reference as if fully set forth herein.

In the IEEE 802.11h [2] supplement to the IEEE 802.11 standard, the entire contents of which supplement are hereby included by reference as if fully set forth herein, measurement requests include a time reference that specifies when a requested measurement is to be done. For example, the 'Measurement Offset' field together with the 'Activation Delay' specifies the reference time in IEEE TGh.

In IEEE TGk draft D 0.1 supplement [3] to the IEEE 802.11 standard, the entire contents of which draft supplement are hereby included by reference as if fully set forth herein, the capability to start measurements at precise start times is replaced by some random interval after that. While this capability might be of some use in some measurements, the capability to start measurements at some precise time is desirable in other types of measurements. For example, an AP may want to have this information in order to hold or deliver traffic when the requested station is doing measurements.

The current IEEE 802.11 mechanism either allows precisely timed measurements or randomized start times. Therefore, it is advantageous to have a flexible mechanism where different types of interpretation of a measurement start time can be communicated in the same Measurement Request.

Due to channel conditions, more than one attempt may be made to communicate a measurement request to a destination station (STA). At the receiving STA, if more than one copy of the same measurement request is received, then the STA discards the most recently received duplicate packets. This is according to the protocol specified in the IEEE 802.11 standard.

The discard of duplicate frames at the receiving STA, according to the IEEE 802.11 protocol, may result in the requesting and receiving STA each having a different reference beacon from which each references measurement start times. For example, if a measurement request is intended to be transmitted in one beacon period and, due to channel conditions, the recipient STA receives the frame correctly while its ACK is not received back at the transmitting STA, and if subsequently the measurement request is successfully transmitted in another beacon period, then, at the transmitting and receiving stations the reference beacons differ.

Thus, in order to overcome the ambiguity in measurement request start times in the present mechanism, a shared standard time is needed as a reference.

The present invention is directed to an apparatus and method for flexibly specifying a measurement start time by modifying a measurement request to include an absolute start time that is optionally a timer synchronization function (TSF) timer value or part thereof, and by optionally modifying a Measurement Request Element to include in a Mode field the interpretation type to be applied to the absolute start time. The absolute start time included in a Measurement Request Frame 300, see FIG. 3, refers to the start time of the first measurement taken by a STA in response to the Measurement Request Frame 300. The absolute start time for a Measurement Request Element 400, see FIG. 4A, refers to the start time of the first Measurement Request 406 contained therein. The Absolute start time 432 for a Measurement Request 430 refers only to the requested measurement.

In a preferred embodiment, the present invention is an apparatus and method for specifying measurement start times by a requestor that transmits a Measurement Request Frame. At least one of (1) a synchronized time reference is employed to which indicated start times refer or (2) a flexibility in interpreting indicated start times is provided by including in a Mode Field, in a Measurement Request Element, bits that are to be used to interpret the indicated start time with respect to the element to be measured.

In another preferred embodiment, the present invention is directed to an apparatus and method of that allows flexibility for 802.11 measurements by including a Measurement Mode field in an Measurement Request Element and specifying in the Mode Field bits that specify whether the indicated start time for each measurement is to be: 1) followed as in the request; 2) randomized; 3) ignored; or 4) immediate. An additional Mode Field bit indicates whether the actual measurement start time is to be reported back. The indicated start time can be specified in terms of a time synchronization function (TSF) timer value or part thereof in order to eliminate ambiguity between the measuring STA and a STA that receives a Measurement Report containing the measurements.

FIG. 4D illustrates some possible values for the Start field of the Measurement Request Mode field illustrated in FIG. 4B, that can be used to specify the type of Start Time interpretation to be applied to the Measurement Request Element in which the Mode field is contained.

FIG. 4E illustrates some possible values for the Measurement Type field of the Measurement Request Element illustrated in FIG. 4A, that can be used to specify the type of measurement being requested.

FIG. 4F illustrates a Measurement Request field format for a Basic Request.

In the following description, by way of explanation and not limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details.

Figure 2A:
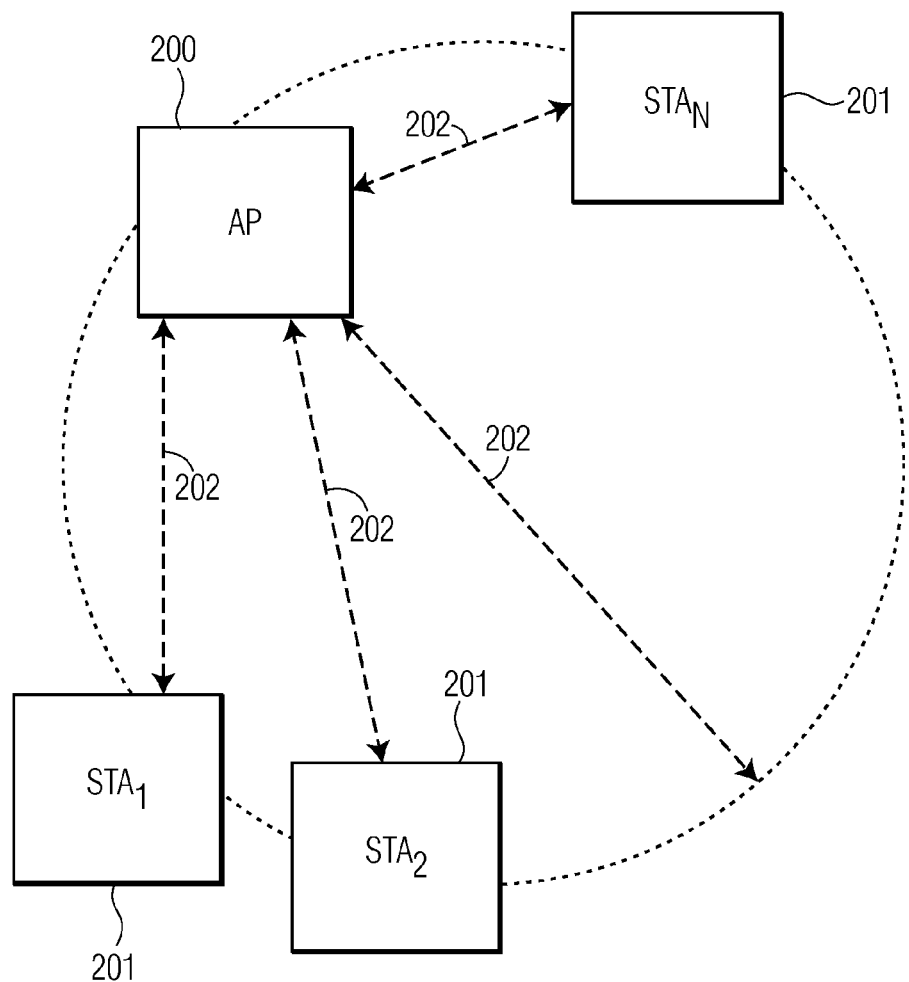
FIG. 2A illustrates a simplified block diagram of an access point (AP) and each station ($STA_i$) within a particular basic service set (BSS) according to an embodiment of the present invention.
Figure 2B:
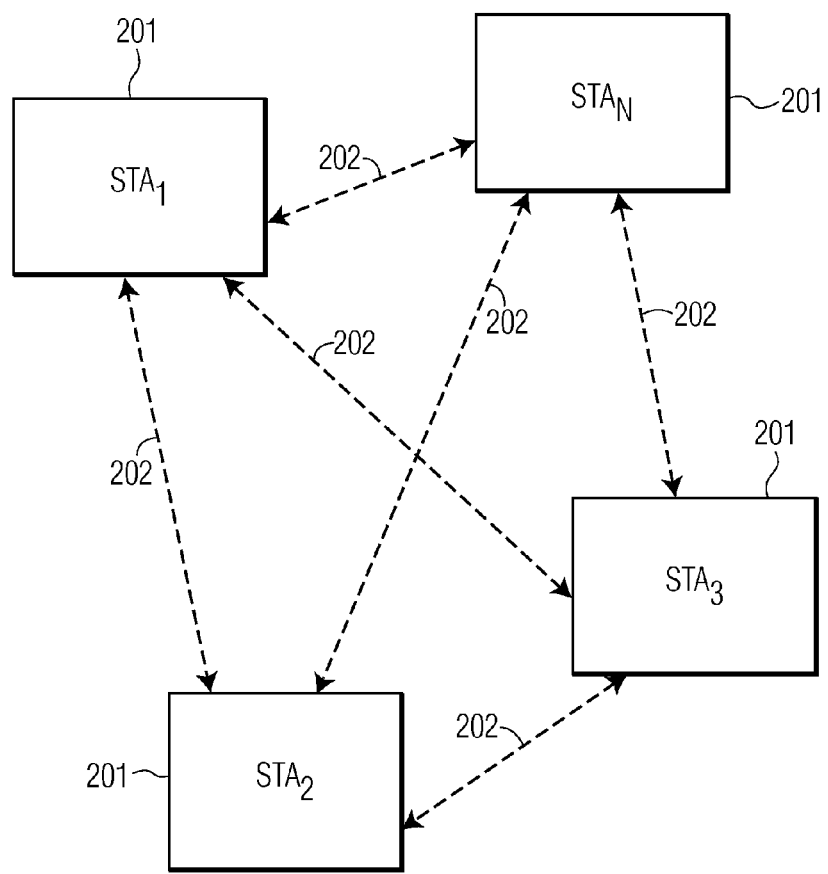
FIG. 2B illustrates a simplified block diagram of each station ($STA_i$) within a particular independent or ad-hoc type basic service set (IBSS) according to an embodiment of the present invention.

FIG. 2A is a representative basic service set (BSS) wireless network whereto embodiments of the present invention are to be applied. As shown in FIG. 2A, an access point (AP) 200 is coupled to a plurality of mobile stations ($STA_i$) 201, which, through wireless links 202 are communicating with each other and the AP via a plurality of wireless channels. A key principle of the present invention is to provide a mechanism to increase flexibility of start time interpretation and/or express start time as a TSF timer value for measurements performed by an AP 200 and $STA_i$ 201. FIG. 2B is a representative independent basic service set (IBSS) wireless network whereto embodiments of the present invention are to be applied. As shown in FIG. 2B, a plurality of mobile stations ($STA_i$) 201 communicate with each other through wireless links 202 without any AP. It should be noted that the each network shown in FIGS. 2A-B is small for purposes of illustration. In practice most networks would include a much larger number of mobile $STA_i$ 201.

In IEEE 802.11h, measurement requests include a time reference indicating when a requested measurement is to be done. For example, the 'Measurement Offset' field together with 'Activation Delay' specifies the reference time in IEEE TGh. The 'Activation Delay' field is the number of beacon markers (TBTTs) to wait before beginning measurements and the 'Measurement Offset' field is the time from the last of these TBTTs. The specification of time in this manner can result in ambiguity as discussed above.

In IEEE TGk draft D 0.1 the capability to start measurements at precise start times is replaced by some random interval after that. While this capability might be of some use in some measurements, the capability to start measurements at some precise time is desirable in other types of measurements. For example, an AP may want to have this information in order to hold or deliver traffic when the requested station is doing measurements. Further, as discussed above, the ambiguity problem caused by the requestor of a measurement and the receiver getting out of synchronization due to loss of an ACK, still exists.

Thus, the prior art mechanisms either allows a measurement time reference which can introduce ambiguity concerning measurement time between a measurer and a receiver of measurements (which may or may not be the requestor thereof) or randomized start times. Therefore, there is a need in the art to have both an absolute time reference and a flexible mechanism where different types of interpretation of the start time are communicated in the same measurement request.

The apparatus and method of the present invention provides a mechanism for avoiding any ambiguity in measurement start time by specifying start times with an absolute time reference. The problem described above is solved in the apparatus and method of the present invention in any one or more of the following ways: by including an absolute time reference in the Measurement Request frame, in a Measurement Request Element, and in a Measurement Request. Flexibility is provided in the apparatus and method of the present invention by optionally including a Mode field in the Measurements Request Element. The Mode field specifies how a measurer is to interpret the measurement start time for each measured element. In a preferred embodiment, three-bit encoding is used to specify the interpretations illustrated in FIG. 4D.

Figure 1:
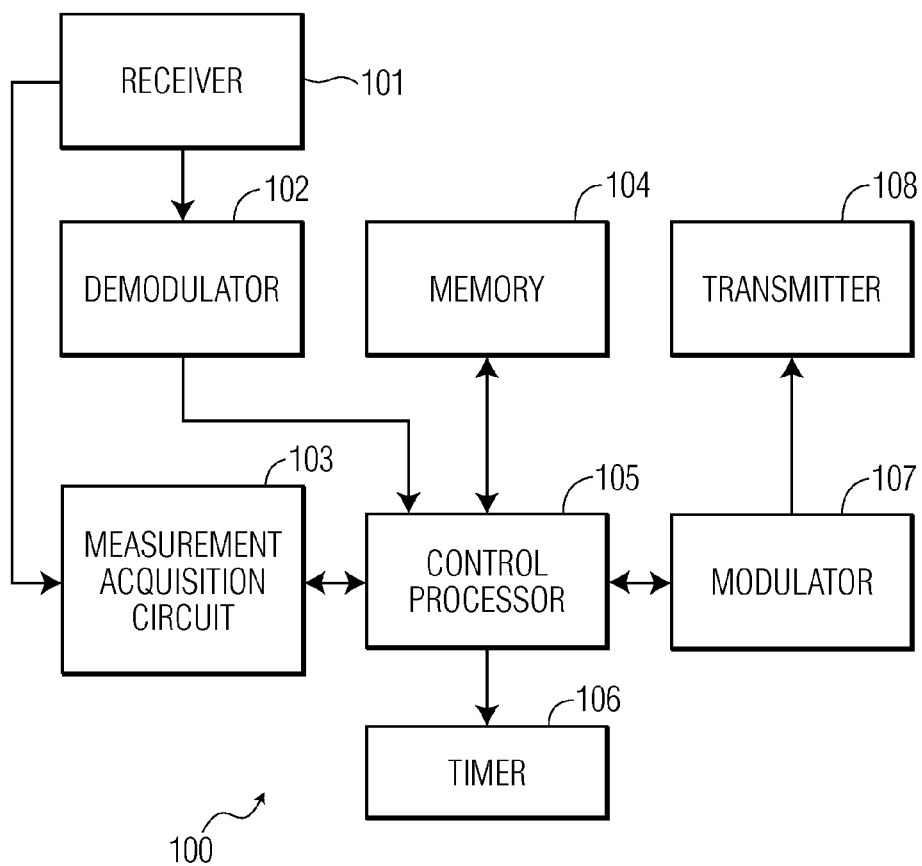
FIG. 1 is a simplified block diagram illustrating the architecture of a wireless communication system whereto embodiments of the present invention are to be applied.

FIG. 1 illustrates an architecture that may be included in the AP and each STA within the WLANs of FIGS. 2A-B. Both the AP 200 and $STA_i$ 201 may include a receiver 101, a demodulator 102, a measurement acquisition circuit 103, a memory 104, a control processor 105, a TSF timer or part thereof 106, a modulator 107, and a transmitter 108. The exemplary system 100 of FIG. 1 is for descriptive purposes only. Although the description may refer to terms commonly used in describing particular mobile stations, the description and concepts equally apply to other processing systems, including systems having architectures dissimilar to that shown in FIG. 1.

In operation, the receiver 101 and the transmitter 108 are coupled to an antenna (not shown) to convert received signal and transmit desired data into and from corresponding digital data via the demodulator 102 and the modulator 107. The measurement acquisition circuit 103 operates under the control of the control processor 105 to construct a Measurement Request Frame 300 that includes a Measurement Start Time 304 which is set equal to a value of the TSF timer or part thereof 106 at which the first measurement of the Measurement Request Frame is to be done. Requested measurement(s) are indicated by at least one Measurement Request Element 305 contained in the Measurement Request Frame 300.

Figure 4A:
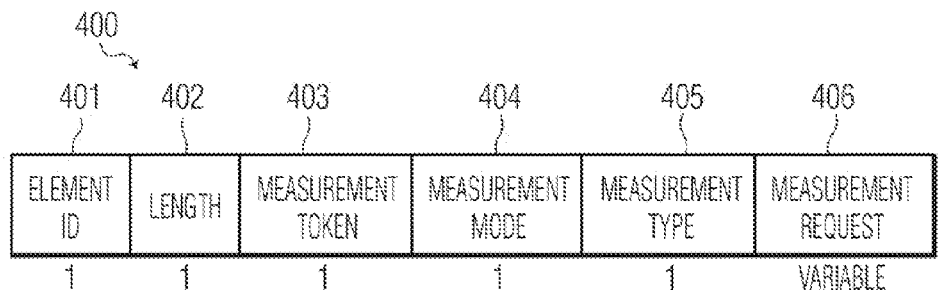
FIG. 4A illustrates a Measurement Request Element format, including the modification of a Measurement Mode field, that can be used to specify the interpretation of a start time of a measurement of an element according to an embodiment of the present invention.
Figure 4B:
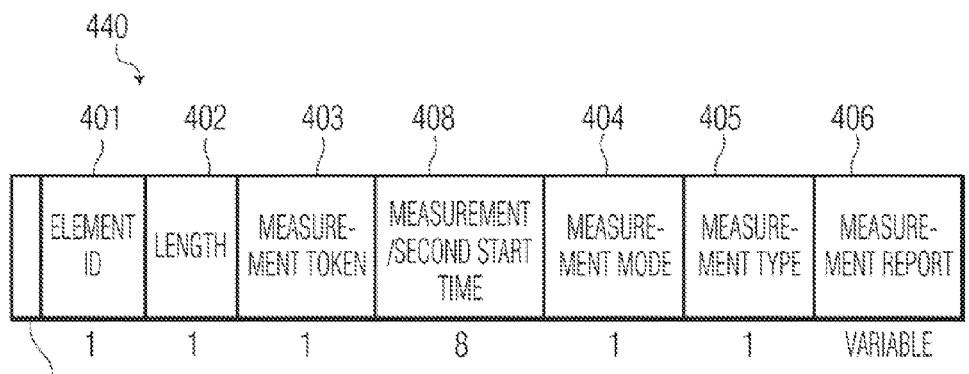
FIG. 4B illustrates a Measurement Request Element format, including the modifications of both a Measurement Mode field and a Measurement Request Element Start Time.
Figure 4C:
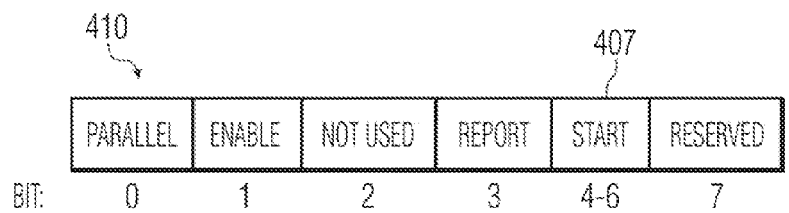
FIG. 4C illustrates a Measurement Request Mode Field format, including the modification of a Start field for specifying the type of interpretation of the Start Time of the Measurement Request Frame that is to be applied for the Measurement Request Element in which it is contained.

In an alternative embodiment, the format of a Measurement Request Element 400 is modified to include a Measurement Mode field 404, as shown in FIG. 4A. The format of the Measurement Request Mode field 410 is illustrated in FIG. 4C wherein the Start field 407 is defined as illustrated in FIG. 4D.

Figure 3:
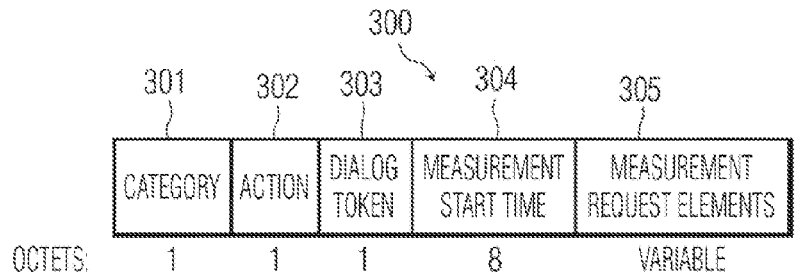
FIG. 3 illustrates a Measurement Request Frame format, including the modification of a Measurement Start Time field, that can be used to transmit a request for measurement of particular elements between stations according to an embodiment of the present invention.

In a preferred embodiment, a Measurement Request Frame 300 is transmitted by a STA or AP requesting another STA of a BSS or IBSS to measure one or more channels. A preferred embodiment of the format of the Measurement Request Frame body 300 is shown in FIG. 3 with the following settings for the fields thereof:

The Category field 301 is set equal to the value indicating a Radio Measurement or Spectrum Management category. In an alternative preferred IEEE 802.11 embodiment of the present invention the category field is specified in Table 1 in 7.3.11 of the 802.11h D3.11 draft standard;

The Action field 302 is set equal to the value indicating Measurement Request. In an alternative preferred 802.11 embodiment of the present invention the Action field is specified in Table 5 in 7.4.1 of the 802.11h D3.11 draft standard;

The Dialog Token field 303 is set equal to a non-zero value chosen by the STA transmitting the Measurement Request Frame in order to identify the request/report transaction;

The Measurement Start Time field 304 is set to a time, in an alternative preferred embodiment to a TSF timer value at which the measurement specified by the first Measurement Request Element is to start. If the Measurement Start Time is set equal to zero, the measurement specified by the first Measurement Request Element is to begin after reception of the Measurement Request Frame 300. The presence of the Measurement Start Time field 304 is optional.

The Measurement Request Elements field 305 contains at least one Measurement Request Element. In a first alternative embodiment, a Measurement Request Element has the format 400 illustrated in FIG. 4A. In a second alternative embodiment, a Measurement Request Element has the format 440 illustrated in FIG. 4B. In an 802.11 embodiment of the present invention, the number and length of the Measurement Request Elements in a Measurement Request Frame 300 is limited by the maximum allowed medium access control (MAC) management protocol data unit MMPDU size. The subfields of the modified element are:

1. The Element ID subfield 401 is set equal to a unique identifier;
2. The Length subfield 402 is variable and depends on the length of the Measurement Request field. The minimum value of the length field is 3.
3. The Measurement Token subfield 403 is set to a non-zero number that is unique among the a Measurement Request Elements in a particular Measurement Request Frame.
4. The optional Measurement Mode subfield 404 is illustrated in FIG. 4C and in a preferred embodiment includes a Start sub-field 407 that specifies the interpretation of the Start Time 304 or 408 or 432 (whichever Start Time has priority for a given measurement) to be applied to the measured element as shown in FIG. 4D,
5. The Measurement Element Start time field 408 is set to a time, in an alternative preferred embodiment to a TSF timer value, at which the measurement specified by the Measurement Request Element 400 is to start If the Measurement Element Start Time 408 is set equal to zero, the measurement specified by the first Measurement Request Element is to begin after reception of the Measurement Request Frame 300. The presence of a Measurement Element Start Time field 408 is optional and overrides the Measurement Frame Start Time 304 if it is present in the frame 300.
6. The Measurement Type subfield 405 is set to the type of measurement being requested and may include one of several request types 420, and
7. The Measurement Request subfield 406 is set to provide additional parameters for accomplishing the type of measurement being requested, for example, when the Measurement Request Type is a Basic Request type the Measurement Request has the format 430 illustrated in FIG. 4F, comprising the following fields:
   a Channel Number field 431 is set equal to the channel number to which the measurement request applies,
   a optional Measurement Start Time field 432 is set equal to an absolute timer value, e.g., a TSF timer at the time (±32:s) at which the requested Measurement Request is to start and a value of 0 indicates measurement starts immediately if there is no Measurement Mode subfield 404, bit if there is a Measurement Mode subfield 404 then measurement starts as indicated by the Mode subfield 404 relative to Measurement Start Time field 432, and
   a Measurement Duration field 433 is set equal to the duration of the requested measurement, expressed in TUs.

In an alternative preferred embodiment, the measurement offset, i.e., Start Time field 304 408 432, is specified in less than an 8-byte field by using only the desired number of least significant bits of an 8-byte absolute timer value, e.g., a TSF timer value. For example, it could be specified in 4-byte field by truncating the four most significant bytes of the TSF timer value.

Furthermore, some of the least significant bits of a TSF timer value may not be used, if the highest resolution of 1 microsecond is not needed. For example, if bits 36-5 are used, then the minimum achievable resolution is 32:s and specifying this in such a manner reduces implementation complexity.

While the preferred embodiments of the present invention have been illustrated and described, it will be understood by those skilled in the art that various changes and modifications may be made, and equivalents may be substituted for elements thereof without departing from the true scope of the present invention. For example, an absolute time reference is supplied in an outer layer of a Measurement Request Frame or in an inner layer of an individual basic request of a Measurement Request Element in any combination with a Measurement Mode. In addition, many modifications may be made to adapt to a particular situation, such as format changes of the frames and elements, and the teaching of the present invention can be adapted in ways that are equivalent without departing from its central scope. Therefore it is intended that the present invention not be limited to the particular embodiment disclosed as the best mode contemplated for carrying out the present invention, but that the present invention include all embodiments falling within the scope of the appended claims.

LIST OF REFERENCES

[1] IEEE 802.11 WG Reference number ISO/IEC 8802-11: 1999(E) IEEE Std 802.11, 1999 edition. International Standard [for] Information Technology-Telecommunications and information exchange between systems-Local and metropolitan area networks-Specific Requirements—Part 11: Wireless LAN Medium Access Control (MAC) and Physical Layer (PHY) specifications. New York USA: The Institute of Electrical and Electronics Engineers, Inc. 1999.

[2] IEEE 802.11 WG IEEE Std 802.11h/D3, May 2003 Edition. Draft Supplement to IEEE Standard for Information Technology—Telecommunications and Information Exchange Between Systems—LAN/MAN Specific Requirements—Part 11: Wireless Medium Access Control (MAC) and physical layer (PHY) specifications: Spectrum and Transmit Power Management extensions in the 5 GHz band in Europe.

[3] IEEE 802.11 WG IEEE Std 802.11k/D0.4, July 2003. Draft Supplement to IEEE Standard for Information Technology—Telecommunications and Information Exchange Between Systems—LAN/MAN Specific Requirements—Part 11: Wireless Medium Access Control (MAC) and physical layer (PHY) specifications: Specification for Radio Resource Measurement

What is claimed is:

1. A processor-based method for specifying measurement start times in a network Measurement Request Frame in a wireless network comprising one of a station and an access point, wherein at least one of the station and the access point is adapted to perform the steps comprising:
   formatting the Measurement Request Frame to have a Measurement Request Elements field comprising at least one Measurement Request Element, said at least one Measurement Request Element comprising at least one Measurement Request for a given type of network measurement; and
   specifying an absolute Start Time in at least one of the Measurement Request Frame, the Measurement Request Element, and the Measurement Request, wherein the absolute Start Time is set to zero to indicate that the corresponding measurement is to be initiated after reception of the Measurement Request Frame.

2. The method of claim 1, further comprising the step of setting a Measurement Mode field to a value that specifies how to interpret the absolute Start Time for starting measurement of the element.

3. The method of claim 2, wherein said setting step further comprises the step of using a three bit encoding to represent a selected indicator.

4. The method of claim 1, further comprising the steps of:
   including in the at least one Measurement Request Element a Measurement Mode field; and
   setting said Measurement Mode field to a value that specifies how to interpret the absolute Start Time for starting measurement of the element.

5. The method of claim 4, wherein said setting step further comprises using a three bit encoding to represent a selected indicator.

6. The method according to claim 1, wherein said absolute Start Time is based on a time synchronization function (TSF) timer value.

7. An apparatus that formats a Measurement Request Frame having an unambiguous measurement Start Time, comprising:
   a measurement acquisition circuit that formats the Measurement Request Frame to have a Measurement Request Elements field that comprises at least one Measurement Request Element that comprises at least one Measurement Request for a given type of network measurement;
   a TSF timer; and
   a control processor coupled to said measurement acquisition circuit and said TSF timer and configured to set an absolute Start Time in at least one of the Measurement Request Frame, the Measurement Request Element, and the Measurement Request, wherein the absolute Start Time is set to zero to indicate that the corresponding measurement is to be initiated after reception of the Measurement Request Frame.

8. The apparatus according to claim 7, wherein said absolute Start Time is based on a time synchronization function (TSF) timer value.

* * * * *